United States Patent [19]
Kawase et al.

[11] 3,989,664
[45] Nov. 2, 1976

[54] STABILIZED POLYESTER COMPOSITION AND METHOD FOR STABILIZING POLYESTER

[75] Inventors: Shoji Kawase; Hiroo Inata; Takeo Shima, all of Iwakuni, Japan

[73] Assignee: Teijin Limited, Osaka, Japan

[22] Filed: Apr. 21, 1975

[21] Appl. No.: 569,687

Related U.S. Application Data

[60] Continuation-in-part of Ser. No. 548,988, Feb. 10, 1975, which is a division of Ser. No. 417,918, Nov. 21, 1973, Pat. No. 3,904,578.

[30] Foreign Application Priority Data

Nov. 24, 1972 Japan.............................. 47-117095

[52] U.S. Cl. .................. 260/45.85 B; 260/75 R
[51] Int. Cl.² ........................................... C08K 5/13
[58] Field of Search ................. 260/45.85 B, 75 R

[56] References Cited
UNITED STATES PATENTS

| | | | |
|---|---|---|---|
| 3,285,855 | 11/1966 | Dexter et al. ................. | 260/45.85 B |
| 3,763,109 | 10/1973 | Witsiepe ...................... | 260/45.95 R |
| 3,856,749 | 12/1974 | Hoeschle..................... | 260/45.95 R |

*Primary Examiner*—V. P. Hoke
*Attorney, Agent, or Firm*—Sherman & Shalloway

[57] ABSTRACT

A method for stabilizing a polyester at least 80% of the recurring units of which in terms of number consist of tetramethylene terephthalate units or tetramethylene-2,6-naphthalate units, by incorporating into said polyester 0.001 to 10% by weight, based on the weight of the polyester, of at least one compound of the following formula (I)

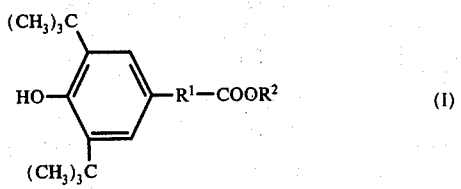

(I)

12 Claims, No Drawings

STABILIZED POLYESTER COMPOSITION AND METHOD FOR STABILIZING POLYESTER

This application is a continuation-in-part of application Ser. No. 548,988, filed Feb. 10, 1975, which in turn is a divisional application of Ser. No. 417,918 filed Nov. 21, 1973, now U.S. Pat. No. 3,904,578.

This invention relates to an improved method for stabilizing a polyester and to polyester compositions obtained by such method. More specifically, the invention relates to a method for stabilizing a polyester, at least 80% of the recurring units of which, in terms of number, consist of tetramethylene terephthalate units or tetramethylene 2,6-naphthalate units, against oxidation. Furthermore, the invention relates to a stabilized polyester composition whihc has superior stability against oxidation for prolonged periods of time and with good reproductibility of stabilization, and which does not cause coloration of the polyester but permits an increased rate of crystallization of the polymer in melt-shaping, thereby imparting improved moldability.

It is known that poly(tetramethylene terephthalate) and poly(tetramethylene-2,6-naphthalate) have poor resistance to degradation by oxygen, heat and light but high rate of crystallization as compared respectively with poly(ethylene terephthalate) and poly(ethylene-2,6-naphthalate). According to this invention, superior resistance to degradation is obtained, and, in addition, a greater rate of crystallization can be achieved even though the stability of the polyester is not related to its rate of crystallization.

Various stabilizers for synthetic polymeric materials including polyesters have been proposed. However, only a very few of them are in actual commercial use because these stabilizers have been unable to meet all of the requirements of a satisfactory stabilizer. These requirements include, in addition to exhibiting superior stabilizing effects, the ability to maintain the stabilizing effects for prolonged periods of time with good reproducibility and without adversely affecting the physical properties of the polymeric materials and without imparting color to the polymers; they must also be easy to produce and easy to incorporate into the polymer and must be available at low cost.

Previously, dialkylhydroxyphenylalkanoic acid esters of di- and tri-pentaerythritol expressed by the following formula (i)

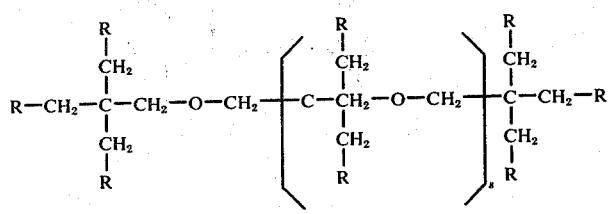

wherein, $s$ has a value of zero or 1 and each R is a group having the following structure

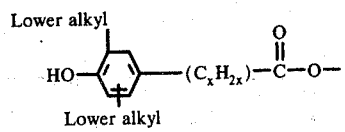

wherein $x$ is 1 to 6, were proposed as stabilizers for polyesters such as polymethylene terephthalate, vinyl resins, polyolefins, polyurethanes, polyamides, animal oils and vegetable oils (U.S. Pat. No. 3,642,868).

The above compounds are produced by reacting di- or tri-pentaerythritol with a compound of the formula (ii)

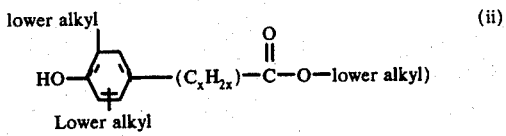

in the presence of a hydride or lower alkoxide of an alkaline metal.

It has now been found that at least one compound of formula (I)

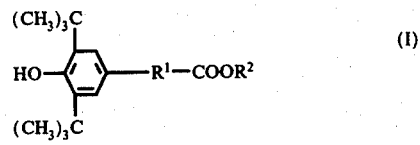

wherein $R^1$ is a divalent organic group, and $R^2$ is an alkyl group or aryl group,
which can be produced with ease and at low cost and which include the compounds of the formula (ii) cited above impart superior feasible stabilizing effects and an increased rate of crystallization to a polyester at least 80% of the recurring units of which in terms of number consist of tetramethylene terephthalate units or tetramethylene 2,6-naphthalate units.

Various other compounds having a hindered phenol group or an analogous group are known as stabilizers for polymers.

For example, U.S. Pat. No. 3,644,482 discloses compounds of the following formula

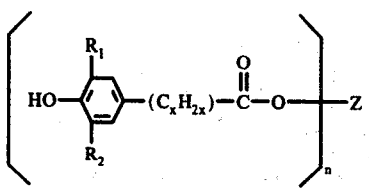

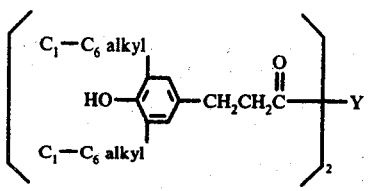

wherein $R_1$ is $-CH_3$, $-C_2H_5$ or α-branched alkyl of $C_3\sim C_{10}$, $R_2$ is H, $-CH_3$, $-C_2H_5$ or α-branched alkyl of $C_3\sim C_{10}$, $x = 1\sim 6$, $n = 2\sim 6$ and Z is an aliphatic hydrocarbon of the formula $C_yH_{2y+2+n}$, in which $y = 2\sim 18$ when $n = 2$ and $y = 3\sim 6$ when $n>2$, such that $y \geqq n$.

Furthermore German Offenlegungsschrift No. 2,150,327 discloses a mixture of compounds expressed by the following two formulae wherein Y is $-NH \cdot CH_2 -\!\!\bigcirc\!\!- CH_2 \cdot NH-$, $-NH-(C_mH_{2m})-NH-$ or

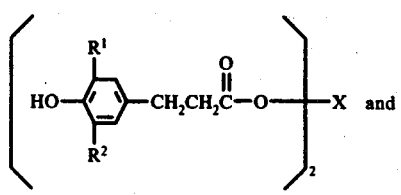

or a compound of the following formula

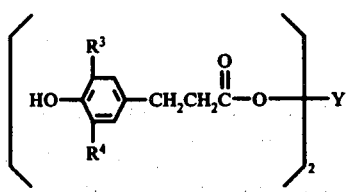

wherein $R^1$ and $R^2$ are, independently, methyl, isopropyl, sec. butyl or tert.butyl; $R^3$ and $R^4$ are, independently, isopropyl, sec.butyl or tert.butyl; and X and Y are dissimilar $C_3 - C_{18}$ alkylene groups which have two non-geminal valency bonds.

Furthermore, German Offenlegungsschrift No. 2,158,014 and No. 2,158,015 disclose the conjoint use of a compound of the following formula wherein Y' is alkylene of $C_1 - C_{10}$ or $-C_2H_4-S-C-C_2H_4-$, and a hypophosphite of a Group IA, IIA or IIB metal, and also the conjoint use of a compound of the following formula

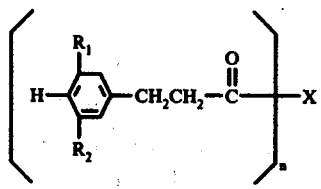

wherein $R_1$ is H or alkyl of $C_1 - C_5$, $R_2$ is alkyl of $C_1-C_5$, X is $-N\!\!<\!\!\begin{smallmatrix}R_3\\R_4\end{smallmatrix}$, $-N\!\!-\!\!\!-\!\!\begin{smallmatrix}\\ \\R_5\end{smallmatrix}\!\!-\!\!Y\!-\!N\!\!-\!\!\begin{smallmatrix}\\ \\R_5\end{smallmatrix}\!\!-\!\!\!-$, $-NH-Z-N-Z-NH-$,

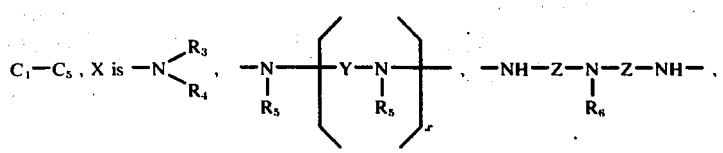

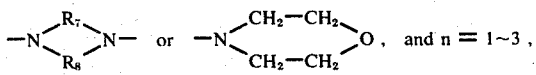

and $n = 1\sim 3$, and a phosphorus-containing compound as a stabilizer for polyamides.

Furthermore, U.S. Pat. No. 3,681,531, Dutch Laid-Open Publication No. 72.09214 and Dutch Laid-Open Publication No. 72.09230 propose compounds having a hindered phenol group.

U.S. Pat. No. 3,816,377 discloses a process of treating or coating liear condensation polyester resin chips to prevent their sticking to each other or the reactor during solid state polymerization to increase their intrinsic viscosity. According to one proposal in this patent, the polyester chips are solid-state polymerized in the presence of a treating agent which includes phenolic compounds within the scope of formula (I) in order to prevent the polyester chips from sticking to each other or to the reactor during the solid-state polymerization. This U.S. patent does not, however, suggest using these treating agents for the purpose of stabilizing the polyester against oxidation or increasing the rate of crystallization of the polyester during melt-shaping. Further, according to this U.S. patent, the treating agent simply adheres on the surface of the resulting solid state polymerized polyester chips and is not uniformly incorporated throughout the polyester chips. Accordingly, the polyester chips of this U.S. patent cannot substantially attain stability against oxidation, and invite very reduced limiting viscosity [$\eta$] with passage of time and increased terminal carboxyl groups. This makes it hard to avoid the drying step that may be effected for the purpose of reducing hydrolysis at the time of molding the polyester chips or to overcome poor stability that are inherent to the polyester resins.

According to this invention, the superior feasible stabilizing effect and the effect of increasing the rate of crystallization of polymer can both be achieved by using at least one compound of the formula (I) above which can be produced with relative ease as compared with the compounds disclosed in the prior art references above.

Therefore, an object of this invention is to provide a method for producing a stabilized polyester composition by adding a specific stabilizing agent to a polyester, at least 80% of the recurring structural units of which, in terms of number, consist of tetramethylene terephthalate units of tetramethylene 2,6-naphthalate units, such polyester composition having a long lasting stabilizing effect and an increased rate of crystallization.

Another object of this invention is to provide a polyester composition with long lasting stability and an increased rate of crystallization.

Many other objects of this invention along with its advantages will become clearer from the following description.

The method for producing a stabilized polyester composition according to the present invention includes incorporating into a polyester, at least 80%, preferably at least 90%, of the recurring units of which, in terms of number, consist of tetramethylene terephthalate units or tetramethylene 2,6--naphthalate units, from about 0.001 to about 10% by weight, preferably from about 0.001 to about 5% by weight, based on the weight of the polyester, of at least one compound of the formula (I) given hereinabove, at any stage before the completion of the melt-polycondensation reaction of forming the polyester and optionally an additive such as an ultraviolet inhibitor, a coloring agent and a fluorescent brightening agent.

The composition of this invention may be a solid molding composition in various forms such as molding powder, granule, pellet or flake, or in the form of a melt-shaped article such as fibers or films prepared by melt-shaping this composition. The composition of this invention may optionally contain inorganic or organic fillers.

The polyester used in this invention can be prepared by any known melt state reaction method using a dicarboxylic acid component at least 80 mol%, preferably at least 90 mol%, of which consists of terephthalic acid, naphthalene-2,6-dicarboxylic acid or their polyester-forming derivatives, and a glycol component at least 80 mol%, preferably at least 90 mol%, of which consists of tetramethylene glycol or its polyester-forming derivatives. For example, an alkyl ester of the above-mentioned dicarboxylic acid is reacted with the glycol by heating in the presence of an ester-interchange reaction catalyst such as a tetraalkyl titanate or calcium acetate, and heating the resulting glycol in the molten state in the presence of a polycondensation reaction catalyst such as a tetraalkyl titanate.

Examples of the other dicarboxylic acid component to be used in an amount of not more than 20 mol%, preferably not more than 10 mol% are naphthalene-2,6-dicarboxylic acid (when the main component is terephthalic acid), terephthalic acid (when the main component is naphthalene-2,6-dicarboxylic acid), isophthalic acid, naphthalene-2,7-dicarboxylic acid, naphthalene-1,5-dicarboxylic acid, 4,4'-diphenyldicarboxylic acid, 4,4'-diphenoxyethanedicarboxylic acid, p-hydroxybenzoic acid, sebacic acid, and adipic acid. Examples of the other glycol component to be used in an amount of not more than 20 mol%, preferably not more than 10 mol% are alkylene glycol or cycloalkylene glycol, such as ethylene glycol, trimethylene glycol, hexamethylene glycol, decamethylene glycol, cyclohexanedimethylol, and neopentylene glycol.

According to the method of this invention, at least one of the compounds of formula (I) is incorporated into a polyester, at least 80%, preferably at least 90 mol% of the recurring units of which, in terms of number consist of tetramethylene terephthalate units or tetramethylene, 2,6-naphthalate units in an amount of 0.001 to 10% by weight, preferably 0.001 to 5% by weight, especially 0.005 to 1% by weight, based on the weight of the polyester, at any desired stage before the completion of the melt-polycondensation reaction of forming the polyester. The time of incorporation may be any time before the completion of the melt-polycondensation reaction of forming the polyester. For example, such a compound may be added to the charge stock for forming the polyester, or may be added at the start or during the reaction of forming the polyester or after the reaction but before the resulting polyester solidifies.

Preferred compounds of the formula (I) are those in which R¹ is alkylene having 1 to 5 carbon atoms, cycloalkylene having 6 to 12 carbon atoms, xylylene, phenylene, oxyalkylene of formula -O-(CH₂)ₘ-, in which m is an integer of 1 to 6, oxyarylene of formula

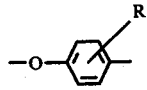

wherein R is a hydrogen atom, a halogen atom, nitro, alkyl having 1 to 4 carbon atoms,

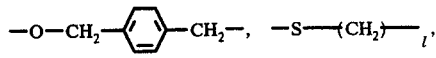

in which $l$ is an integer of 1 to 6 and

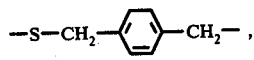

and R² is alkyl having 1 to 20 carbon atoms, phenyl group, phenyl substituted with alkyl having 1 to 4 carbon atoms, alkoxy having 1 to 4 carbon atoms, hydroxyl, or naphthyl.

Specific examples of the compounds of formula (I) include the following:

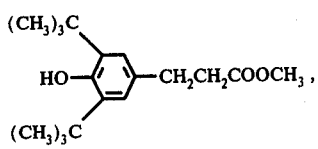 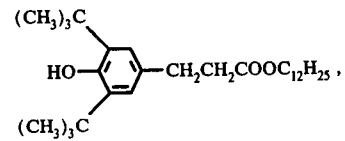

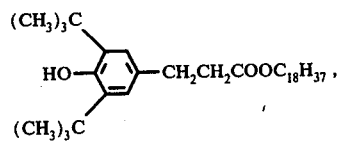 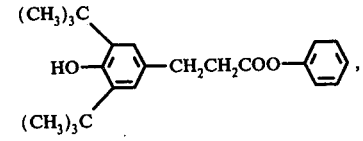

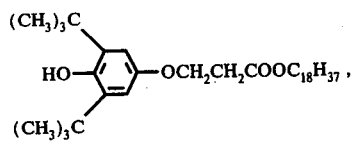 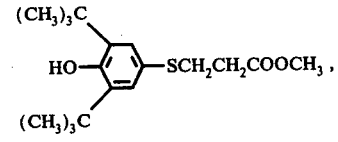

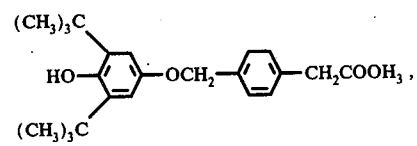

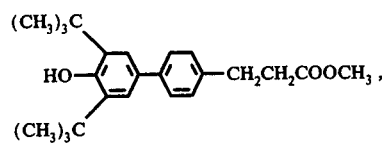

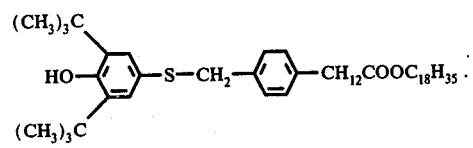

The composition of this invention may further contain various additives such as a stabilizer, coloring agent, fire retardant, fluorescent bleaching agent, mold releasing agent, nucleating agent, lubricant, filler or a blowing agent.

The stabilizer may, for example, be a light stabilizer or heat stabilizer. Specific examples of the light stabilizer include benzotriazole compounds such as 2-hydroxy-3-chloro-5-t-butylbenzotriazole, benzophenone compounds such as 2,4-dihydroxybenzophenone, and phenyl salicylate-type compounds such as phenyl salicylate. Examples of the heat stabilizer include sulfur compounds such as dilauryl thiopolypronate, and phosphorus compounds such as phosphoric acid, phosphorus acid, phosphinic acid, phosphonic acid or esters of these phosphorus containing acids.

The coloring agent may be any desired dye or pigment.

Examples of the fire retardant include halogen-containing aromatic compounds such as hexabromobenzene, an oligomeric polycabonate of tetrabromobisphenol A, decabromobiphenyl, decabromobiphenyl ether, or tetrabromophthalic anhydride, and phosphorus compounds such as tris(2,3-di-bromopropyl phosphate) or polyaryl phosphenates. The retardant may be used conjointly with an assistant such as antimony trioxide.

One example of the mold releasing agent is silicone.

Examples of the lubricant include barium stearate, calcium stearate, and liquid paraffin.

The nucleating agent may, for example, be an inorganic nucleating agent such as talc, an organic nucleating agent such as benzophenone, or a salt such as sodium terephthalate.

The filler includes, for example, glass fibers, carbon fibers, asbestos, or rock wool. The incorporation of these fillers is preferred because they give rise to a greater improvement in the mechanical characteristics, resistance to thermal deformation and fire retardance of the composition of this invention.

Preferably, the amounts of these additives are as follows based on the weight of the polyester: not more than 5% by weight of the stablilizer; not more than 30% by weight of the fire retardant (as a total amount, when an assistant is used); 0.05 to 5% by weight of the mold releasing agent; 0.01 to 5% by weight of the nucleating agent; 0.01 to 5% by weight of the lubricant; 1 to 50% by weight of the filler. The amount of the coloring agent is usually 0.01 to 5% by weight based on the weight of the polyester.

The following Examples illustrate the present invention in greater detail. In the Examples, all parts are parts by weight, and [$\eta$] represents the intrinsic viscosity of the polymer measured in ortho-chlorophenol at 35° C. The [COOH] represents the molar equivalent of the carboxyl groups per $10^6$ g of polymer. The rate of crystallization is measured as follows: Chips of polymer having an average diameter of about 0.5 to 1 mm are dried and then melted at 270° C for 3 minutes, followed by quenching by being dipped in a bath at a temperature of 150° C for a predetermined period of time. The specific gravity of the sample is measured. The time required until the specific gravity reaches a value intermediate between the specific gravity of the amorphous sample and that of the sample whose crystallization reaches an equilibrium is expressed by seconds. The smaller the figure showing the time in seconds, the faster is the rate of crystallization.

EXAMPLE 1 AND COMPARATIVE EXAMPLES 1 AND 2

A reactor equipped with a distillation column was charged with 64.7 parts of dimethyl terephthalate, 69.0 parts of tetramethylene glycol and 0.023 part of tetrabutyl titanate, and heated at 150° to 220° C for 60 minutes. Methanol in an almost theroretical amount was distilled off. The ester interchange reaction product was transferred to a polycondensation reaction vessel. While raising the temperature, the pressure in the reactor was gradually reduced until finally the pressure reached about 0.5 mmHg absolute. The temperature then reached about 270° C.

Then, with stirring, the product was melt-polycondensed for 150 minutes under the above conditions of pressure and temperature. Then by introducing a nitrogen gas to the reaction vessel and raising the pressure to the atmospheric pressure, 0.073 part (0.1% by weight based on the weight of the polyester) of stearyl 3(3',5'-di-t-butyl-4-hydroxyphenyl)propionate was added with stirring to the molten state melt-polycondensation reaction product.

The resulting polyester had an [$\eta$] of 1.14 and a [COOH] of 27. The rate of crystallization of this polymer was 5 seconds.

For comparison, (Comparative Example 1), the above procedure was repeated except that the stearyl 3(3',5'-di-t-butyl-4'-hydroxyphenyl) propionate was not added, and a polyester having an [$\eta$] of 1.13, a [COOH] of 24, and a rate of crystallization of 19 seconds was obtained.

Further, for the purpose of comparison (Comparative Example 2), the polyester obtained in the same manner as above but without adding stearyl 3(3',5'-di-t-butyl-4'-hydroxyphenyl) propionate, was recovered from the reaction vessel and cut into polytetramethylene terephthalate chips (3mm × 3mm × 3mm) having a viscosity [$\eta$]=0.62. 100 parts of the resulting polyester chips was mixed with 0.1 part of a stearyl 3-(3',5'-di-t-butyl-4-hydroxyphenyl) propionate, and subjected to the solid state polycondensation of 210° C, under a reduced pressure of about 0.5 mmHg with stirring for 4 hours to obtain a polyester having a viscosity [$\eta$]=1.15 and [COOH] = 19.

Each of these polyesters was pulverized to a particle size of 10 to 15 mesh, and exposed for a predetermined period of time in air at 170° C. The results are shown in Table 1.

TABLE 1

| Run | Properties | Before* treatment | After 2 days | After 7 days | After 21 days |
|---|---|---|---|---|---|
| Example 1 | [$\eta$] | 1.14 | 1.13 | 1.09 | 1.02 |
|  | [COOH] | 27 | 29 | 33 | 44 |
| Comparative Example 1 | [$\eta$] | 1.13 | 0.91 | 0.79 | 0.58 |
|  | [COOH] | 24 | 42 | 93 | 205 |
| Comparative Example 2 | [$\eta$] | 1.15 | 0.95 | 0.82 | — |
|  | [COOH] | 19 | 39 | 85 | — |

*Note Value of polyester or polyester composition before being exposed to the air of 170° C. The same holds true in the following Tables.

EXAMPLES 2 TO 5 AND COMPARATIVE EXAMPLES 3 TO 7

The procedure of Example 1 was repeated except that each of the stabilizing compounds shown in Table 2 was used in the amount indicated. The results are shown in Table 2. For comparison, known stabilizers were used, and the results are also shown in Table 2. For further comparison, compositions were obtained in the same manner as in Example 2 using the polyethylene terephthalate that was obtained in the same manner as in Example 1 but using 43.4 parts of ethylene glycol in place of tetramethylene glycol and setting the melt polycondensation reaction temperature at 280° C. The results are shown in Table 2. The amounts indicated are based on the weight of the polyester.

TABLE 2

| Run No. | Stabilizers Type | Amount (wt%) | Polyester | | Change with time Before treatment | After 7 days | After 21 days | Rate of crystallization (before treatment) (seconds) |
|---|---|---|---|---|---|---|---|---|
| Control | (None) | — | tetramethylene terephthalate | $[\eta]$ [COOH] | 1.13 24 | 0.79 98 | 0.58 205 | 19 |
| Ex. 2 | (CH$_3$)$_3$C—, HO—◯—CH$_2$CH$_2$—COC$_{18}$H$_{37}$, (CH$_3$)$_3$C— | 0.02 | tetramethylene terephthalate | $[\eta]$ [COOH] | 1.14 22 | 1.06 31 | 0.92 55 | 10 |
| Comp. Ex. 3 | (CH$_3$)$_3$C—, HO—◯—CH$_2$CH$_2$—COC$_{18}$H$_{37}$, (CH$_3$)$_3$C— | 0.02 | polyethylene terephthalate | $[\eta]$ [COOH] | 1.13 23 | 0.84 37 | — — | 86 |
| Comp. Ex. 4 | (CH$_3$)$_3$C—, HO—◯—CH$_3$, (CH$_3$)$_3$C— | 0.1 | tetramethylene terephthalate | $[\eta]$ [COOH] | 1.11 28 | 0.83 80 | 0.62 205 | 15 |
| Ex. 3 | (CH$_3$)$_3$C—, HO—◯—CH$_2$CH$_2$—COCH$_3$, (CH$_3$)$_3$C— | 0.1 | tetramethylene terephthalate | $[\eta]$ [COOH] | 1.09 17 | 0.95 24 | 0.90 41 | 4 |
| Comp. Ex. 5 | (CH$_3$)$_3$C—, HO—◯—CH$_2$CH$_2$—COCH$_3$, (CH$_3$)$_3$C— | 0.1 | polyethylene terephthalate | $[\eta]$ [COOH] | 1.15 22 | 0.92 31 | — — | 88 |
| Ex. 4 | (CH$_3$)$_3$C—, HO—◯—CH$_2$CH$_2$CO—◯, (CH$_3$)$_3$C— | 0.05 | tetramethylene terephthalate | $[\eta]$ [COOH] | 1.12 21 | 1.07 29 | 0.93 49 | 9 |
| Comp. Ex. 6 | (CH$_3$)$_3$C—, HO—◯—CH$_2$CH$_2$CO—◯, (CH$_3$)$_3$C— | 0.05 | polyethylene terephthalate | $[\eta]$ [COOH] | 1.15 20 | 0.89 33 | — — | 88 |
| Ex. 5 | (CH$_3$)$_3$C—, HO—◯—CH$_2$CH$_2$—COC$_{12}$H$_{25}$, (CH$_3$)$_3$C— | 0.05 | tetramethylene terephthalate | $[\eta]$ [COOH] | 1.15 22 | 1.09 30 | 1.00 42 | 7 |
| Comp. Ex. 7 | (CH$_3$)$_3$C—, HO—◯—CH$_2$CH$_2$—COC$_{12}$H$_{25}$, (CH$_3$)$_3$C— | 0.05 | polyethylene terephthalate | $[\eta]$ [COOH] | 1.14 23 | 0.81 44 | — — | 87 |

EXAMPLE 6 AND COMPARATIVE EXAMPLE 8

A reactor equipped with a distillation column was charged with 73.2 parts of dimethyl 2,6-naphthalene dicarboxylate, 40.5 parts of tetramethylene glycol, 0.02 part of tetrabutyl titanate and 0.08 part of myristyl-2-(3',5'-di-t-butyl-4'-hydroxy phenyl) propionate, and heated at 150° to 220° C for 60 minutes. An almost theoretical amount of methanol was distilled off. Then, the ester interchange reaction product was transferred to a polycondensation reaction vessel, and while raising the temperature to 260° C, the pressure was gradually reduced until finally the pressure reached about 0.5 mmHg absolute. The polycondensation of the product was performed for 90 minutes. The polyester obtained had an [$\eta$] of 0.82 and a [COOH] of 17.

For comparison, the above procedure was repeated except that the myristyl-2-(3',5'-di-t-butyl-4'-hydroxy phenyl) propionate was not added.

Each of these polymers was pulverized to a particle size of 10 to 15 mesh, and exposed in air at 200° C for a predetermined period of time. The results are shown in Table 3.

TABLE 3

| Run | Properties | Before treatment | After 7 days | After 21 days |
|---|---|---|---|---|
| Example 6 | [$\eta$] | 0.84 | 0.81 | 0.75 |
|  | [COOH] | 18 | 25 | 32 |
| Comparative | [$\eta$] | 0.80 | 0.72 | 0.63 |
| Example 8 | [COOH] | 16 | 33 | 52 |

The procedure of Example 6 was repeated using the compounds of the following formulae in place of using the above myristyl-2-(3',5'-di-t-butyl-4'-hydroxyphenyl) propionate, and nearly the same results were obtained.

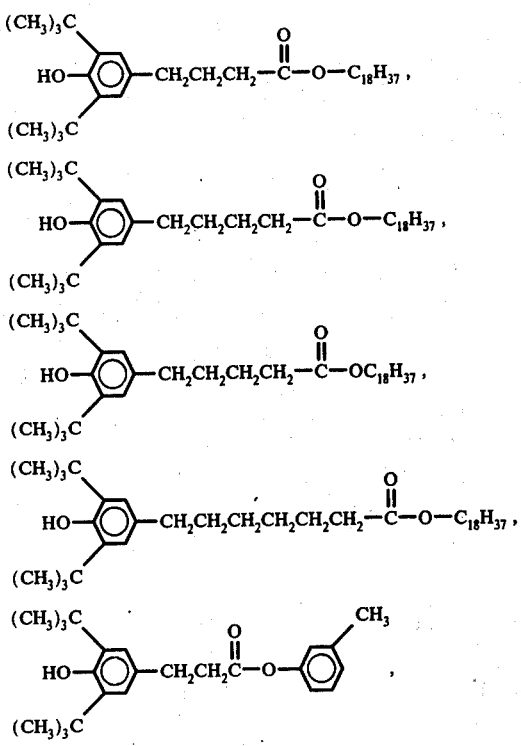

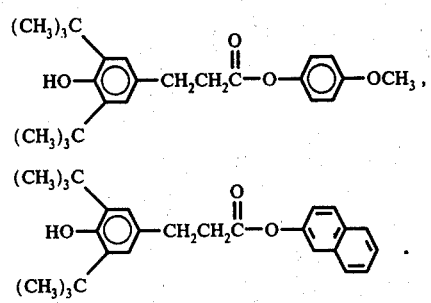

What we claim is:

1. A stabilized polyester composition wherein said polyester is formed by melt-polycondensation comprising a polyester, at least 80% of the recurring units of which in terms of number, consists of tetramethylene terephthalate units or tetramethylene 2,6-naphthalate units, wherein said polyester is derived from the melt state reaction between dicarboxylic acid component, at least 80 mol% of which consists of terephthalic acid, naphthalene-2,6-dicarboxylic acid or their polyester-forming derivatives and up to 20 mol% of a dicarboxylic acid component selected from naphthalene-2,6-dicarboxylic acid when the main component is terephthalic acid, terephthalic acid when the main component is naphthalene-2,6-dicarboxylic acid, isophthalic acid, naphthalene-2,7-dicarboxylic acid, naphthalene-1,5-dicarboxylic acid, 4,4'-diphenyldicarboxylic acid, 4,4'-diphenoxyethanedicarboxylic acid, p-hydroxypenzoic p-hydroxybenzoic sebacic acid, and adipic acid and a glycol component at least 80 mol% of which consists of tetramethylene glycol or its polyester-forming derivatives and not more than 20 mol% of a glycol component selected from alkylene glycol or cycloakylene glycol and 0.001 to 10% by weight, based on the weight of said polyester, of at least one compound selected from compounds of formula (I)

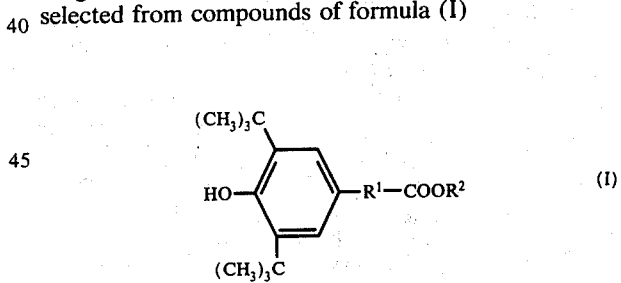

wherein $R^1$ is a divalent organic group, and $R^2$ is an alkyl or aryl group, wherein said compound of formula (I) is incorporated into said polymer at any stage before the completion of the melt-polycondensation reaction for forming the polyester.

2. The composition of claim 1 wherein $R^1$ is a member selected from the group consisting of alkylene having 1 to 5 carbon atoms, cycloalkylene having 6 to 12 carbon atoms, xylylene, phenylene, oxyalkylene of formula -O-(CH$_2$)$_m$-, in which m is an integer of 1 to 6, oxyarylene of formula

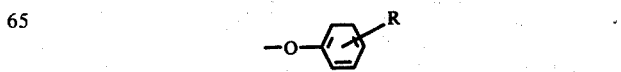

wherein R is a hydrogen atom, a halogen atom, nitro or alkyl having 1 to 4 carbon atoms,

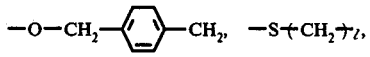

in which *l* is an integer of 1 to 6 and

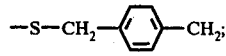

and $R^2$ is a member selected from the group consisting of akyl having 1 to 20 carbon atoms, phenyl, phenyl substituted with alkyl having 1 to 4 carbon atoms, alkoxy having 1 to 4 carbon atoms or hydroxyl, and naphthyl.

3. The composition of claim 1 wherein said composition further contains an additive selected from the group consisting of an ultraviolet ray inhibitor, coloring agent, fluorescent bleaching agent and filler.

4. The composition of claim 1 which is in the form of a molding solid composition.

5. The composition of claim 1 which includes from 0.005 to 1% by weight of the polyester of the compound of formula (I).

6. A method for stabilizing a polyester formed by a melt-polycondensation reaction and increasing the rate of crystallization of said polyester during said melt-poly-condensation reaction, at least 80% of the recurring units of which in terms of number, consist of tetramethylene terephthalate units or tetramethylene 2,6-naphthalate units, wherein said polyester is derived from the melt state reaction between dicarboxylic acid component at least 80mol% of which consists of terephthalic acid, naphthalene-2,6-dicarboxylic acid or their polyester-forming derivatives and up to 20 mol% of a dicarboxylic acid component selected from naphthalene-2,6-dicarboxylic acid when the main component is terephthalic acid, terephthalic acid when the main component is naphthalene-2,6-dicarboxylic acid isophthalic acid, naphthalene-2,7-dicarboxylic acid, naphthalene-1,5-dicarboxylic acid, 4,4'-diphenyldicarboxylic acid, 4,4'-diphenoxyethanedicarboxylic acid, p-hydroxybenzoic acid, sebacic acid, and adipic acid and a glycol component at least 80 mol% of which consists of tetramethylene glycol or its polyester-forming derivatives and not more than 20 mol% of a glycol component selected from alkylene glycol or cycloakylene glycol comprising, incorporating into said polyester prior to the completion of the melt polycondensation reaction of forming said polyester, from 0.001 to 10% by weight, based on the weight of said polyester, of at least one compound of formula (I)

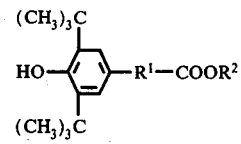

wherein $R^1$ is a divalent organic group, and $R^2$ is an alkyl or aryl group, wherein said compound of formula (I) is incorporated into said polyester at any stage before the completion of the melt-polycondensation reaction for forming the polyester.

7. The method of claim 5 wherein $R^1$ is a member selected from the group consisting of alkylene having 1 to 5 carbon atoms, cycloalkylene having 6 to 12 carbon atoms, xylylene, phenylene, oxyalkylene of formula -O-(CH_2)_m-, in which m is an integer of 1 to 6, oxyarlyene of formula

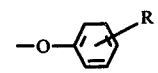

wherein R is a hydrogen atom, a halogen atom, nitro or alkyl having 1 to 4 carbon atoms,

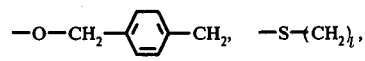

in which *l* is an integer of 1 to 6 and

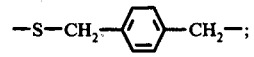

and $R^2$ is a member selected from the group consisting of alkyl having 1 to 20 carbon atoms, phenyl, phenyl substituted with alkyl having 1 to 4 carbon atoms, alkoxy having 1 to 4 carbon atoms or hydroxyl and naphthyl.

8. The method of claim 5 wherein said composition further contains an additive selected from the group consisting of an ultraviolet ray inhibitor, coloring agent, fluorescent bleaching agent and filler.

9. The method of claim 6 wherein from 0.005 to 1% by weight of the compound of formula (1), based on the weight of the polyester, is incorporated into the polyester prior to the completion of the melt polycondensation reaction.

10. The composition of claim 1 which is in the form of a melt-shaped article.

11. The composition of claim 1 wherein said compound of formula (1) is selected from the group consisting of

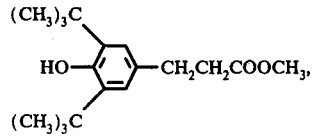

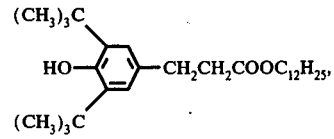

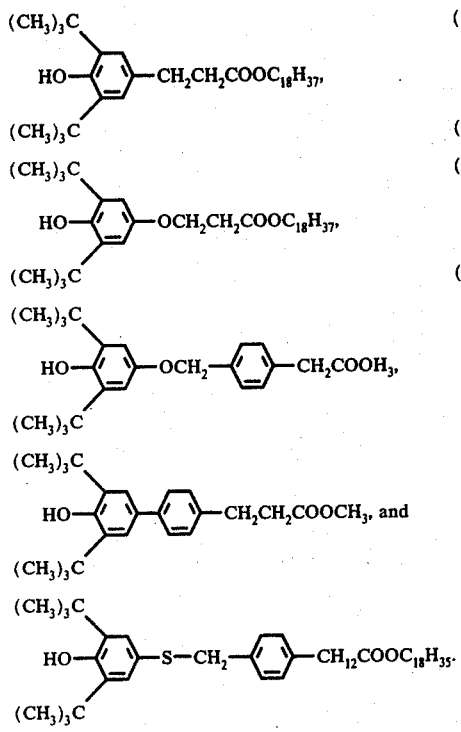
12. The method of claim 6 wherein said compound of formula (1) is selected from the group consisting of
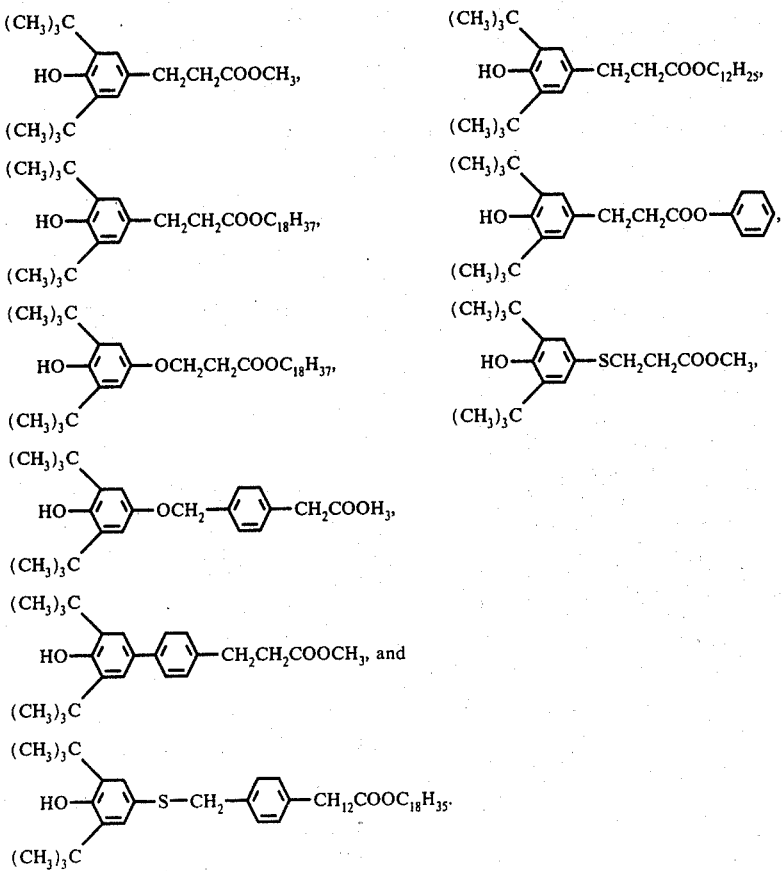

UNITED STATES PATENT AND TRADEMARK OFFICE
CERTIFICATE OF CORRECTION

PATENT NO. : 3,989,664
DATED : November 2, 1976
INVENTOR(S) : KAWASE, ET AL.

It is certified that error appears in the above–identified patent and that said Letters Patent are hereby corrected as shown below:

Claim 1, line 17, delete "p-hydroxypen-".

Claim 1, line 18, delete "zoic",
before "sebacic" insert -- acid, --.

Claim 1, line 31, delete "polymer", insert -- polyester --.

Signed and Sealed this

Twenty-second Day of February 1977

[SEAL]

Attest:

RUTH C. MASON
*Attesting Officer*

C. MARSHALL DANN
*Commissioner of Patents and Trademarks*